United States Patent [19]

Maute

[11] Patent Number: 5,054,719
[45] Date of Patent: Oct. 8, 1991

[54] ACTIVE THREE-AXIS ATTITUDE CONTROL SYSTEM FOR A GEOSTATIONARY SATELLITE

[75] Inventor: P. A. Alexandre Maute, Valbonne, France

[73] Assignee: Aerospatiale Societe Nationale Industrielle, Paris, France

[21] Appl. No.: 417,759

[22] Filed: Oct. 5, 1989

[30] Foreign Application Priority Data

Oct. 6, 1988 [FR] France .................. 88 13122

[51] Int. Cl.⁵ .................. B64G 1/24; B64G 1/36
[52] U.S. Cl. .................. 244/164; 244/171; 364/459
[58] Field of Search .............. 244/164, 165, 171, 169; 364/459, 434

[56] References Cited

U.S. PATENT DOCUMENTS

| | | | |
|---|---|---|---|
| 3,427,453 | 2/1969 | Gill et al. | 244/171 X |
| 3,996,804 | 12/1976 | Neufeld | 244/171 X |
| 4,161,780 | 7/1979 | Rudolph et al. | 244/171 X |
| 4,288,051 | 9/1981 | Göschel | 244/171 X |
| 4,617,634 | 10/1986 | Izumida et al. | 244/171 X |
| 4,728,061 | 3/1988 | Johnson et al. | 244/171 X |
| 4,749,157 | 6/1988 | Neufeld | 244/171 |
| 4,767,084 | 8/1988 | Chan et al. | 244/164 |

FOREIGN PATENT DOCUMENTS

| | | |
|---|---|---|
| 0174715 | 3/1986 | European Pat. Off. . |
| 0209429 | 1/1987 | European Pat. Off. . |
| 0251692 | 1/1988 | European Pat. Off. . |
| 0260957 | 3/1988 | European Pat. Off. . |
| 2601159 | 1/1988 | France . |

Primary Examiner—Margaret A. Focarino
Assistant Examiner—James M. Kannofsky
Attorney, Agent, or Firm—Browdy and Neimark

[57] ABSTRACT

An attitude control system for a stabilized geostationary satellite comprising at least one terrestrial detector ($T_1$) and a stellar detector oriented towards the North further comprises:

a processing subsystem for each of at least the normal mode (I) and the stationkeeping mode (II), adapted to be connected to the detectors and to actuators (11, 12, 13) and comprising a pre-processing module (14–16) adapted to determine for each axis i an angular offset $\epsilon_i$ between a measured angle determined from the detectors and a reference angle together with a control and correction module (18, 20) adapted to determine for each axis a corrective torque of the form:

$$c = k_i . \epsilon_i + h_i . \dot{\epsilon}_i$$

where $k_i$ and $h_i$ are parameters specific to each axis and to each processing line,
a speed $\dot{\epsilon}_i$ measuring unit (24, 25),
and a mode selection unit (26) connecting the detectors to a selected processing line and that processing line to at least one actuator.

18 Claims, 3 Drawing Sheets

ACTIVE THREE-AXIS ATTITUDE CONTROL SYSTEM FOR A GEOSTATIONARY SATELLITE

The invention concerns controlling the attitude of a geostationary satellite stabilised about three axes.

In practice there is associated with a satellite of this kind a direct orthogonal frame of reference (X, Y, Z) of which the X axis (or West-East axis) is theoretically tangential to the orbit and the Z axis (or geocentric axis) is directed towards the Earth. The Y axis (or North-South axis) is perpendicular to the X and Z axes.

Stabilising the satellite with respect to these three axes entails controlling three types of drift: pitch about the North-South Y axis, roll about the East-West X axis and yaw about the geocentric Z axis.

To this end the conventional architecture of a geostationary satellite comprises a terrestrial detector (in practice of the infra-red type) adapted to measure pitch and roll, possibly combined with one or more solar detectors. The yaw angle is controlled passively by means of an inertia wheel the rotation axis of which is perpendicular to the geocentric axis, in practice parallel to the Y axis.

The precision achieved by a known system of this kind is usually in the order of 0.1 to 0.5 degree.

There are four main modes of operation of this attitude control system:

1—the normal mode corresponding to attitude control on the assumption that the orbit is correct;
2—the stationkeeping mode corresponding to attitude control during orbit correction manoeuvres;
3—the survival mode in which, following a control incident, the satellite points an axis of the XZ plane towards the Sun, from which configuration the satellite can be returned to its normal attitude; and
4—the apogee manoeuvre mode in which attitude control is directed to orienting the satellite precisely at the time that apogee thrusts are commanded to move the satellite from a transfer orbit with three-axis stabilisation to its geostationary service orbit.

In practice during stationkeeping manoeuvres any spurious torques due to misalignment of the orbit correction thrusters relative to the axes of the satellite are three orders of magnitude higher than the solar torques experienced in normal mode and the gyroscopic stiffness associated with the inertia wheels controlling yaw passively may be insufficient.

The precision of yaw control is also critical during stationkeeping because the amplitude of orbit correcting manoeuvres about the North-South axis is three orders of magnitude greater than orbit correction manoeuvres about the East-West axis, so that a small error in respect of the yaw angle (of a few tenths of a degree, for example) during North-South manoeuvres induces spurious manoeuvres about the East-West axis which can be of the same order of magnitude as the normal orbit correcting manoeuvres about this East-West axis. This can seriously disturb the process of keeping the satellite on station.

As for survival mode, the return to three-axis stabilisation of the orbit can only be undertaken from a configuration in which the Sun, the Earth and the satellite are not aligned, the satellite-Earth and satellite-Sun directions preferably being perpendicular (which occurs at 06:00 hours and 18:00 hours). This can result in survival mode functioning (and interruption to the mission of the satellite) for several hours: this is becoming more and more incompatible with the mission constraints now applying to satellites.

The invention is directed to alleviating the aforementioned disadvantages by applying active attitude control with respect to three axes.

To this end it employs a stellar detector oriented towards the North, in practice mounted on the North side of the satellite.

In principle the implementation of a stellar detector is known.

The document EP-A-0 174 715 (MITSUBISHI) already proposes the use of a stellar detector, to observe the Pole Star, for example, but only the normal mode is envisaged and if this stellar detector is intended to enable measurement of the yaw angle no attitude control method based on this measurement is described or even suggested. Finally, intervention from the ground is required to periodically upload to the satellite the associated orbit parameters and to compute the three attitude angles of the satellite.

The document FR-2 522 614 (C.N.E.S.) describes a stellar aiming method but this is associated with a specific type of platform entirely different from a conventional geostationary platform. It assumes the division of the platform into two modules (payload module and service module) each stabilised- in a different way. The service module is stabilised inertially and the payload module is pointed towards the Earth.

Finally, the document FR-2 532 911 (C.N.E.S.) describes a method for the apogee manoeuvre of a geostationary satellite which uses a stellar detector in a method which requires an unusual layout of the satellite having serious disadvantages: the apogee thruster is inclined by an angle equal to the declination of the manoeuvre. All the impulsions to be given must therefore be carried out with the same orientation (which is not the case in practice). Moreover, the inclination of the thruster rules out the balancing of disturbing torque except for a given degree of filling of the propellant storage tanks. As these empty the disturbing torques increase.

It therefore appears that known attitude control systems of the type using a stellar detector pointed towards the Pole Star require a rather specific and difficult structure of the satellite and/or are very complex. Furthermore, the signals from the stellar detector are processed only intermittently, corresponding in practice to only one operating mode of the satellite.

A stellar detector has a relatively high mass (3 to 10 kg) and for security reasons it is generally duplicated, resulting in a non-negligible penalty in respect of the payload mass; given the short period of use of the detector as compared with the life of the satellite, the disadvantage of its mass is often regarded as decisive and the decision is often taken to omit it from an attitude control system.

The invention is directed to alleviating these disadvantages by enabling active attitude control with respect to the three axes which is both precise and continuous whilst minimizing the complexity (the mass and the risk of failures) of the associated attitude control system.

To this end it proposes an attitude control system for a geostationary satellite stabilised about mutually perpendicular East-West, North-South and geocentric axes comprising a plurality of detectors including at least one terrestrial detector adapted to be oriented towards the Earth and a stellar detector oriented towards the North along the North-South axis and a plurality of actuators characterized in that it further comprises:

a processing subsystem for each of at least the normal mode (I) and the stationkeeping mode (II), each processing subsystem being adapted to be connected to the detectors and to at least some of the actuators and comprising a pre-processing module adapted to determine for each axis, designated by the respective subscript i, an angular offset $\epsilon_i$ relative to the axis i between a measured angle determined from the signals from the plurality of detectors and a predetermined reference angle together with a control and correction module adapted to determine for each axis designated by its respective subscript i a corrective torque of the form:

$$c = k_i \epsilon_i + h_i \dot{\epsilon}_i$$

where $k_i$ and $h_i$ are parameters specific to each axis and to each processing line and where $\dot{\epsilon}$ is the rate of variation of this angular offset (sometimes denoted $\omega$), a speed measuring unit adapted to measure the angular speed $\dot{\epsilon}_i$ and to be connected to at least the control and correction module of the stationkeeping processing subsystem (II), and a mode selection unit adapted to control an input selector connecting the detectors to a selected processing line and an output selector adapted to connect that processing line to at least one actuator.

The system therefore utilizes for a satellite whose configuration is otherwise conventional (in particular from the point of view of thrusters and inertia wheels) a terrestrial detector and a stellar detector aimed at the Pole Star with its sensitive axis parallel to the Y axis of the satellite and oriented towards the North, possible combined with three wide-angle solar detectors.

It enables yaw to be controlled with a precision in the order of 0.02 degrees in normal mode and in stationkeeping mode.

The resulting advantages include:
greater precision, which finds its application in some new types of mission (inter-satellite links, earth observation and meteorology);
increased security from continuous measurement with respect to the three axes;
simplicity of implementation because the Pole Star remains at all times within the field of the stellar detector and no complex star recognition software is needed.

The angular offset $\epsilon_Z$ about the X axis, referred to as the yaw offset, is preferably measured by establishing the difference between the measurement x from the stellar detector (P) in the plane of the X and Y axes and a value $x_0$ representing the predicted position of the Pole Star in the field of view of the stellar detector assuming that the attitude of the satellite is perfect:

$$\epsilon_Z = x - x_0$$

Objects, characteristics and advantages of the invention will emerge from the following description given by way of non-limiting illustrative example with reference to the appended drawings in which:

FIG. 1 shows schematically a satellite 1 in an orbit 2 about the earth.

Figure 1:
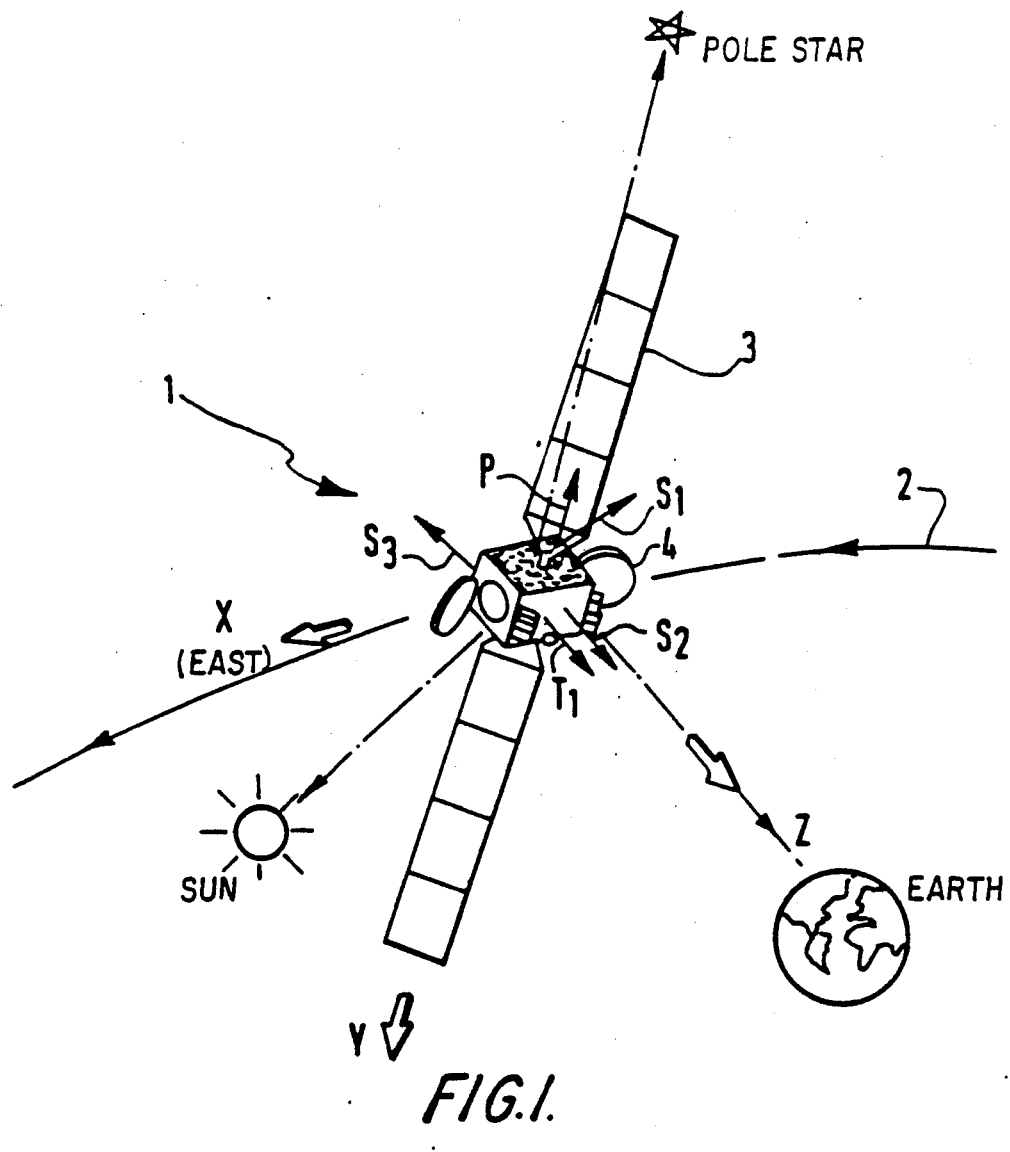
FIG. 1 is a schematic view of a geostationary satellite equipped with an attitude control system in accordance with the invention.

The satellite 1 is conventionally associated with a frame of reference X Y Z in which the X axis is tangential to the orbit 2 and oriented in the direction in which the orbit is travelled (from West to East) and the Z axis is directed towards the Earth; the third, Y axis is parallel to a North-South direction.

The satellite comprises a platform carrying solar panels 3, reflectors 4 and propulsion thrusters of any appropriate known type.

Also in the known way the platform of this satellite comprises at least one terrestrial sensor oriented towards the Earth and schematically represented at $T_1$ together with a plurality of solar detectors distributed in a plane parallel to the plane of the X and Z axes and adapted to face the Sun successively as the satellite completes its orbit. Various configurations are known; to give an example, there are in this instance three solar detectors $S_1$, $S_2$, $S_3$ with one sensor $S_2$ disposed on the side facing towards the Earth and the other two sensors $S_1$ and $S_3$ on the edges opposite this side. In practice, for better solar coverage, an architecture with four solar detectors may be preferable.

In accordance with the invention the platform of the satellite is also provided, in this instance on its North side (opposite the Y axis), with a stellar detector P of any appropriate known type oriented towards the North along the South-North axis. This is a detector chosen from the SODERN or GALILEO range, for example.

As is known, there are currently important differences between the aforementioned three types of detectors, even if they are all optical detectors.

Firstly, the solar detectors $S_1$ through $S_3$, terrestrial detector $T_1$ and stellar detector P are classified in this order by decreasing incident radiated power.

Also, these known detectors are sensitive to different radiation spectra; the terrestrial detectors are sensitive to infra-red radiation from the Earth, the solar detectors are formed of photo-electric cells and the stellar detectors are based on rows or twodimensional arrays of charge-coupled devices (CCD).

The Pole Star is chosen because it is the only star of its magnitude to be always in the field of view of a stellar detector mounted on the North side of a satellite so that its recognition does not require sophisticated software.

The terrestrial detector $T_1$, solar detectors $S_1$ through $S_3$ and stellar detector P make it possible to determine at any time the angular orientation of the Earth, the Sun and the Pole Star in the frame of reference related to the satellite.

The principal innovation of the system relative to the prior art resides not only in the presence of the stellar detector P on the North side but also and mainly in its various implementation procedures adapted to the various kinds of mode and therefore in the processing subsystems associated with these various modes.

The procedures for implementing the stellar detector can cover virtually all the life of the satellite:

I—normal mode: roll and yaw control, fault detection;
II—stationkeeping mode;
III—apogee thrust mode: yaw measurement;
IV—survival mode: minimum mission interruption times (less than 30 minutes).

Figure 2:
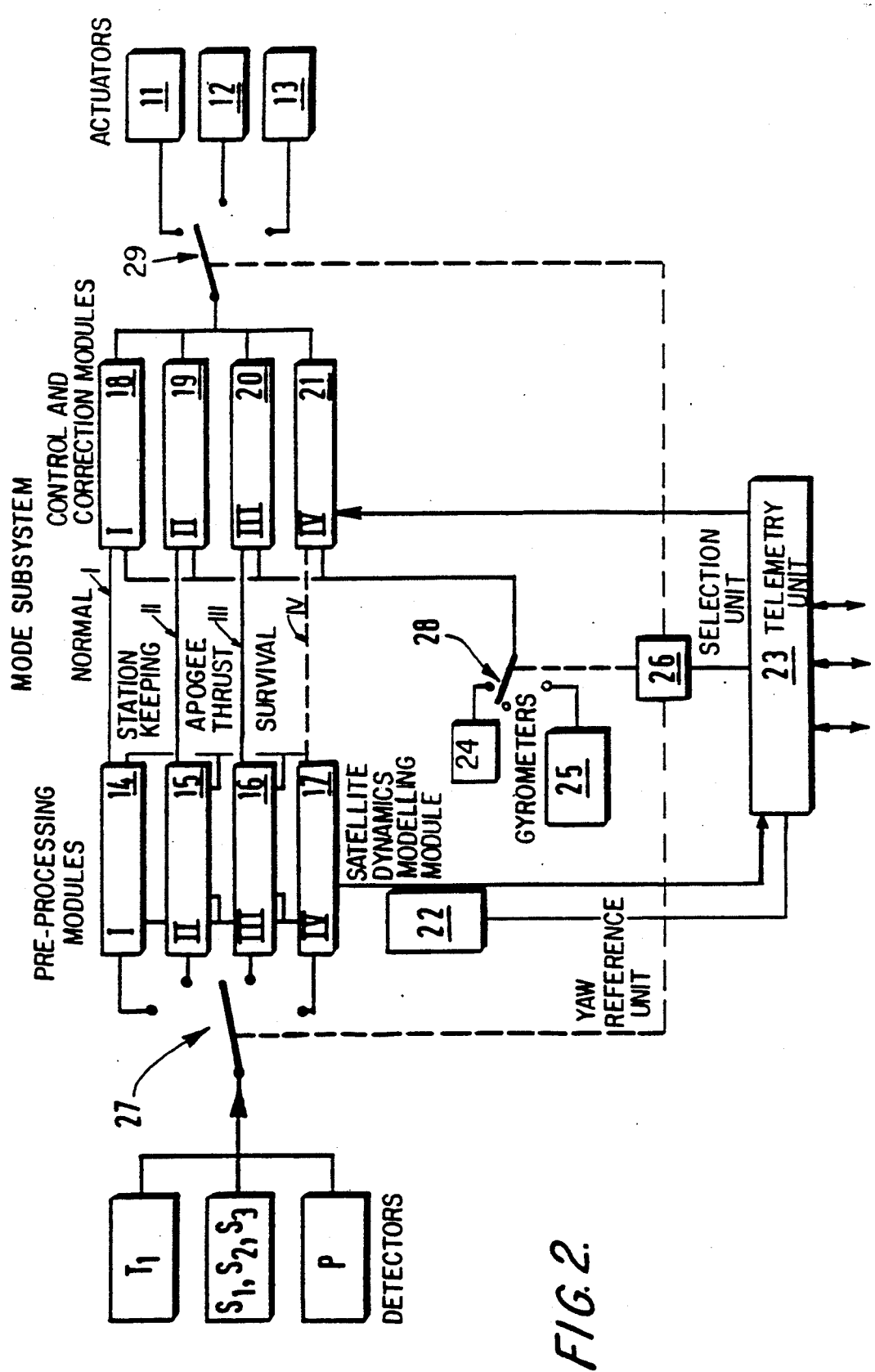
FIG. 2 is a simplified functional schematic of this attitude control system.

With each of these modes there is associated a specific processing subsystem designated in FIG. 2 by the roman numeral associated with the mode concerned: I, II, III or IV.

FIG. 2 shows schematically on the left the set of detectors used for attitude control, namely the stellar detector P facing towards the North and therefore having the Pole Star in its field of view, the solar detectors $S_1$ through $S_3$ and the terrestrial detector $T_1$.

The various detectors deliver at their output signals which are applied to the processing subsystems designed to determine from them the amplitude of the correction manoeuvres to be applied by actuators of any appropriate known type (schematically represented on the right), principally of three types:

reaction wheels 11 (whose direction of rotation depends on the corrections to be applied), generally distributed between the three axes;

inertia wheels 12 (which rotate continuously at high speed, the variations in speed depending on the correction to be made), generally distributed between the three axes;

thrusters 13.

Each of the processing subsystems I through IV comprises a pre-processing module 14 through 17 followed by a control and correction module 18 through 21.

A yaw reference unit 22 is connected to each of the pre-processing modules 14 through 17 and is adapted to estimate continuously the position of the satellite in a predetermined inertial frame of reference. The unit 22 contains a model of the changing position of the Pole Star and is connected to a telemetry unit 23 so that the parameters of this model can be periodically refreshed on the basis of information received from the ground.

The modules 18 through 20 receive in addition to the signals produced by the corresponding pre-processing modules 14 through 16 speed signals produced either by a module 24 modelling the dynamics of the satellite and receiving the signals from the detectors or by gyrometers 25.

In survival mode the output signal from the module 17 is transmitted to the telemetry unit for transmission to the ground while the input of the control and correction module 21 is connected to the telemetry unit to receive correction instructions computed on the ground.

A selection unit 26 controlled from the ground through the telemetry unit 23 controls mode selectors 27, 28 and 29 interconnected so as to correlate the choice (by the mode selector 27) of a mode to the choice (by the mode selector 28) of the computation mode, where necessary, for the role, yaw or pitch rate and the selection of the combination of actuators 11, 12 or 13 to be used with respect to the various correction axes according to the control signals produced by the modules 18 through 21.

In normal mode (I) the three attitude angles of the satellite, including the yaw angle, are continuously controlled.

The control function utilizes directly the measurements from the following detectors:

role and pitch: Earth detector,
yaw: stellar detector.

To control roll and pitch the error signals from the terrestrial detector are usable directly without pre-processing in the modules 14 through 17.

The following operations are necessary for controlling the yaw angle:

on the basis of the ephemerides produced for the satellite by the unit 22 the position of the satellite in an inertial frame of reference is computed;

the same unit 22 then computes the theoretical coordinates $X_0$, $Z_0$ of the Pole Star in the field of view of the stellar detector, for this position and assuming that the attitude of the satellite is perfect (zero roll, pitch and yaw);

the module 14, 15 or 16 computes a yaw error signal $\epsilon_Z = x - x_0$ where is the actual position measured parallel to the X axis of the Pole Star in the two-dimensional field of view of the stellar detector;

module 18, 19 or 20 computes the amplitude of the yaw control action from this error signal and possibly from the yaw angular speed $\dot{\epsilon}_Z$: typically $$C_Z = k_Z \cdot \epsilon_Z + h_Z \cdot \dot{\epsilon}_Z$$

attempting to eliminate the difference $\epsilon_Z$.

Generally speaking, this type of control law $C_i = k_i \cdot \epsilon_i + h_i \cdot \dot{\epsilon}_i$ is used for each of the X, Y and Z axes to be controlled in each of the modules 18 through 20 with coefficients $h_i$ and $k_i$ predetermined for each axis and for each mode.

When it is necessary to take into account the angular speed $\dot{\epsilon}_i (h_i \neq 0)$, in particular during large-scale manoeuvres, which is not the case in practice in the normal mode, it can be measured by the gyrometers 25 or obtained at 24 by differentiation with respect to time using the measurements from the detector and any appropriate type model of the dynamics of the satellite.

The architecture of the detectors proposed by the invention offers additional security.

It is possible to detect and identify the type of a fault possibly occurring in normal mode by verifying (at 18, 19, 20 or 21) the mutual consistency of the detector measurements:

roll: terrestrial and stellar detectors,
pitch: terrestrial and stellar detectors,
yaw: stellar and solar detectors.

If the measurements are mutually consistent there is a dynamic fault and it is necessary to activate a back-up action (often a redundant wheel) or to switch to solar acquisition (survival mode).

If the measurements are not mutually consistent then a detector has failed: as soon as it is identified the redundant detector provided as a back-up has to be activated to perform a reacquisition of the Earth using the appropriate associated wheel.

To simply the diagram, the links carrying these signals resulting from the recognition of a fault have not been shown.

In stationkeeping mode it is imperative to measure the yaw angle; this is provided directly by the stellar detector. Another computation law determines the correction torques, with the same form as previously but with different parameters (the correction torques may be two to three orders of magnitude greater than those for the normal mode, and can be as high as $10^{-2}$ N.m).

The advantage of this method as compared with the prior art is that it can avoid the use of a yaw integrating gyroscope (whence greater reliability, simpler implementation and greater precision without calibration) or the use of solar detectors for yaw, which introduces constraints as to possible manoeuvering times and a penalty in terms of additional propellant consumption.

Figure 3:
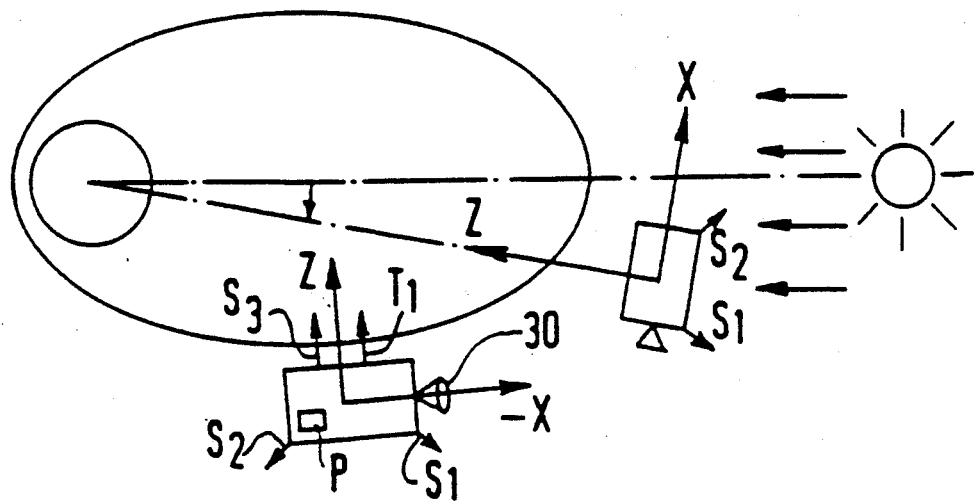
FIG. 3 is a simplified schematic explaining attitude control in apogee manoeuvre mode.

In apogee manoeuvre mode (provided that the satellite has been stabilised with respect to three axes on its transfer orbit) the stellar detector also makes it possible to dispense with a yaw integrating gyroscope (whence increased reliability and precision through reduced complexity). The implementation procedure is shown in FIG. 3:
1) Conventional Earth acquisition by the terrestrial detector, the satellite performing conical scanning controlled by the solar detectors $S_1$ and $S_2$.
2) Yaw control until and during the apogee manoeuvre by the stellar detector. Before the apogee motor 30 is fired the attitude of the satellite may be refined by remote control from the ground, by setting an appropriate bias (offset) relative to the target star. It has been verified that for the usual transfer orbit inclinations (up to 30 degrees) there is always at least one star of magnitude less than six within the field of the detector.

The return of the satellite to normal mode from survival mode in which it is aimed at the Sun can only be done with conventional detector architectures, as explained above, if the Earth, the Sun and the satellite are not aligned, the ideal times from the point of view of attitude precision being those at which the Earth, the satellite and the Sun are in quadrature (06:00 hours and 18:00 hours).

This constraint is eliminated if the stellar detector is used.

Figure 4:
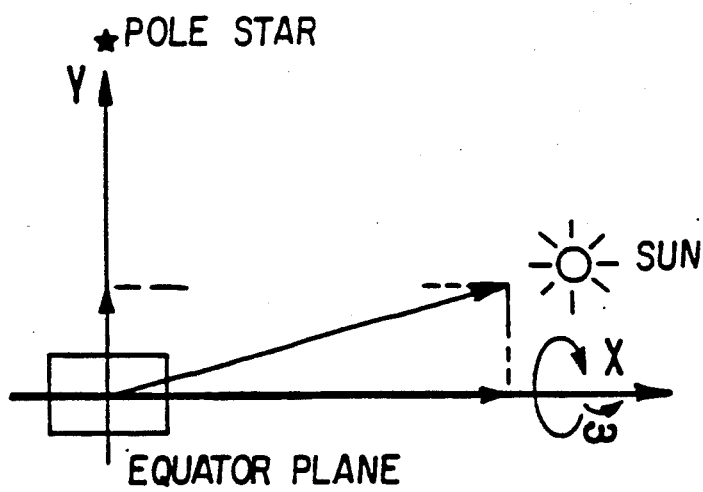
FIG. 4 is a simplified schematic explaining the return to attitude control in survival mode.

Two procedures can be used to this end:
1) Either in a first stage there is a coarse recovery of attitude (precision in the order of a few degrees) followed by improvement of the yaw by setting the appropriate bias on the stellar detector.
2) Or directly, in a single stage, by scanning a series of stars by rotation $\omega$ about the axis defined by the projection of the direction of the Sun in the plane of the equator (see FIG. 4), followed by rotation in yaw about the direction defined by the Pole Star to reacquire the Earth.

It goes without saying that the foregoing description has been given by way of non-limiting illustration only and numerous variations thereon may be put forward by those skilled in the art without departing from the scope of the invention.

I claim:
1. Attitude control system for stabilizing in at least a normal mode and a station keeping mode the attitude of a geostationary satellite about mutually perpendicular East-West, North-South and geocentric axes referred to as axes X, Y and Z comprising a plurality of detectors including at least one terrestrial detector to be oriented towards the Earth and a stellar detector to be oriented towards the North along the North-South axis and a plurality of actuators further comprising:
   a processing line means for each of at least the normal mode (I) and the station-keeping mode (II), each processing line means being adapted to be connected to the detectors and to at least some of the actuators and comprising:
   a pre-processing module adapted to determine for each axis i, with i being X, Y or Z, an angular offset $\epsilon_i$ relative to the axis i between a measured angle determined from signals from the plurality of detectors and a predetermined reference angle; and a control and correction module adapted to determine for each axis i a corrective torque of the form:
   $$c = k_i \epsilon_i + h_i \dot{\epsilon}_i$$
   where $k_i$ and $h_i$ are parameters specific to each axis and to each processing line means where $\dot{\epsilon}_i$ is the rate of variation of this angular offset,
   a speed measuring unit adapted to measure the angular rate $\dot{\epsilon}_i$ and to be connected to at least the control and correction module of the station-keeping processing line means (II), and
   a mode selection unit adapted to control an input selector connecting the plurality of detectors to any selected one of said processing line means and an output selector adapted to connect that processing line means to at least one actuator.
2. System according to claim 1 wherein angular offset $\epsilon_Z$ about the Z axis, referred to as the yaw offset, is measured by establishing the difference between a measurement x from the stellar detector (P) in the plane of the X and Y axes and a value $x_0$ representing a predicted position of the Pole Star in the field of view of the stellar detector assuming that the attitude of the satellite is perfect:

$$\epsilon_Z = X - X_0.$$

3. System according to claim 2 wherein angular offsets $\epsilon_X$ and $\epsilon_Y$ associated with the X and Y axes are taken as equal to measurements from said terrestrial detector.
4. System according to claim 3 wherein the plurality of detectors comprises solar detectors and a further processing line means (IV) is provided for a satellite survival mode, adapted to be connected to the terrestrial, solar and stellar detectors.
5. System according to claim 2, wherein the plurality of detectors comprises solar detectors and a further processing line means (IV) is provided for a satellite survival mode, adapted to be connected to the terrestrial, solar and stellar detectors.
6. System according to claim 5 wherein a further processing line (III) is provided for a apogee manoeuvre mode, connected to at least the terrestrial and stellar detector and comprising a control and correction module adapted to determine correction torques from the formula:
$$C^{III}_i = k^{III}_i \epsilon_i + h^{III}_i \dot{\epsilon}_i.$$

7. System according to claim 6 further comprising two speed measuring units, namely a set of gyrometers and a module modelling the dynamics of the satellite of which one input is connected at least indirectly to the detectors, an intermediate selector connected to the input and output selectors being adapted for each mode of the satellite to connect the control and correction module of the processing line means associated with that mode to the output of at most one of these speed measuring units.
8. System according to claim 7 wherein the plurality of detectors comprises solar detectors and the processing line means are connected to said plurality of detectors so as to be able to measure roll by means of the terrestrial and stellar detectors simultaneously, pitch by means of the terrestrial and solar detectors simultaneously and yaw by means of the solar and stellar detectors simultaneously.

9. System according to claim 1 wherein the plurality of detectors comprises solar detectors and a further processing line means (IV) is provided for a satellite survival mode, adapted to be connected to the terrestrial, solar and stellar detectors.

10. System according to claim 9 wherein a further processing line (III) is provided for an apogee manoeuvre mode, connected to at least the terrestrial and stellar detector and comprising a control and correction module adapted to determine correction torques from the formula:

$$C^{III}{}_i = k^{III}{}_i \cdot \epsilon_i + h^{III}{}_i \cdot \dot{\epsilon}_i.$$

11. System according to claim 9 further comprising two speed measuring units, namely a set of gyrometers and a module modelling the dynamics of the satellite of which one input is connected at least indirectly to the detectors, an intermediate selector connected to the input and output selectors being adapted for each mode of the satellite to connect the control and correction module of the processing line means associated with that mode to the output of at most one of these speed measuring units.

12. System according to claim 9 wherein the plurality of detectors comprises solar detectors and the processing line means are connected to said plurality of detectors so as to be able to measure roll by means of the terrestrial and stellar detectors simultaneously, pitch by means of the terrestrial and solar detectors simultaneously and yaw by means of the solar and stellar detectors simultaneously.

13. System according to claim 1 wherein a further processing line (III) is provided for an apogee manoeuvre mode, connected to at least the terrestrial and stellar detectors and comprising a control and correction module adapted to determine correction torques from the formula:

$$C^{III}{}_i = k^{III}{}_i \cdot \epsilon_i + h^{III}{}_i \cdot \dot{\epsilon}_i.$$

14. System according to claim 13 further comprising two speed measuring units, namely a set of gyrometers and a module modelling the dynamics of the satellite of which one input is connected at least indirectly to the detectors, an intermediate selector connected to the input and output selectors being adapted for each mode of the satellite to connect the control and correction module of the processing line means associated with that mode to the output of at most one of these speed measuring units.

15. System according to claim 13 wherein the plurality of detectors comprises solar detectors and the processing line means are connected to said plurality of detectors so as to be able to measure roll by means of the terrestrial and stellar detectors simultaneously, pitch by means of the terrestrial and solar detectors simultaneously and yaw by means of the solar and stellar detectors simultaneously.

16. System according to claim 1 further comprising two speed measuring units, namely a set of gyrometers and a module modelling the dynamics of the satellite of which one input is connected at least indirectly to the detectors, an intermediate selector connected to the input and output selectors being adapted for each mode of the satellite to connect the control and correction module of the processing line means associated with that mode to the output of at most one of these speed measuring units.

17. System according to claim 16 wherein the plurality of detectors comprises solar detectors and the processing line means are connected to said plurality of detectors so as to be able to measure roll by mans of the terrestrial and stellar detectors simultaneously, pitch by means of the terrestrial and solar detectors simultaneously and yaw by mans of the solar and stellar detectors simultaneously.

18. System according to claim 1 wherein the plurality of detectors comprises solar detectors and the processing line means are connected to said plurality of detectors so as to be able to measure roll by means of the terrestrial and stellar detectors simultaneously, pitch by means of the terrestrial and solar detectors simultaneously and yaw by means of the solar and stellar detectors simultaneously.

* * * * *